(12) United States Patent
Nakamori

(10) Patent No.: US 6,715,571 B2
(45) Date of Patent: Apr. 6, 2004

(54) FUEL CELL POWERED MOTOR VEHICLE

(75) Inventor: Masaharu Nakamori, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/972,875

(22) Filed: Oct. 10, 2001

(65) Prior Publication Data

US 2002/0066606 A1 Jun. 6, 2002

(30) Foreign Application Priority Data

Dec. 5, 2000 (JP) ........................................ 2000-369642

(51) Int. Cl.[7] ........................ B60K 1/04; B60K 13/04; B60K 17/34
(52) U.S. Cl. .................... 180/65.1; 180/65.3; 180/296; 180/233
(58) Field of Search ............... 180/65.1, 65.2, 180/65.3, 291, 296, 297, 68.5, 233, 241, 245

(56) References Cited

U.S. PATENT DOCUMENTS

| 3,911,284 | A | * | 10/1975 | Skala | 290/16 |
| 4,192,216 | A | * | 3/1980 | Wait | 89/40.03 |
| 5,141,823 | A | * | 8/1992 | Wright et al. | 429/19 |
| 5,641,031 | A | * | 6/1997 | Riemer et al. | 180/65.3 |
| 5,662,184 | A | * | 9/1997 | Riemer et al. | 180/65.1 |
| 5,699,872 | A | * | 12/1997 | Miyakawa et al. | 180/291 |
| 5,858,568 | A | * | 1/1999 | Hsu et al. | 429/13 |
| 6,105,701 | A | * | 8/2000 | Buell | 180/229 |
| 6,158,537 | A | * | 12/2000 | Nonobe | 180/65.3 |
| 6,244,367 | B1 | * | 6/2001 | Ahmed et al. | 180/65.1 |
| 6,276,473 | B1 | * | 8/2001 | Zur Megede | 180/65.2 |
| 6,380,637 | B1 | * | 4/2002 | Hsu et al. | 290/1 R |
| 6,445,080 | B1 | * | 9/2002 | Daqoa et al. | 307/9.1 |
| 6,448,535 | B1 | * | 9/2002 | Ap | 219/208 |
| 6,516,905 | B1 | * | 2/2003 | Baumert et al. | 180/53.8 |
| 6,520,273 | B1 | * | 2/2003 | Ishikawa | 180/65.3 |

FOREIGN PATENT DOCUMENTS

| FR | WO 02/29918 A1 | * | 4/2002 | B60L/11/18 |
| JP | 3-109126 | | 5/1991 | |
| JP | 08119180 A | * | 5/1996 | B62M/23/02 |
| JP | 2001347982 A | * | 12/2001 | B62M/7/02 |
| JP | 2002124269 A | * | 4/2002 | H01M/8/02 |

* cited by examiner

*Primary Examiner*—Brian L. Johnson
*Assistant Examiner*—Bridget Avery
(74) *Attorney, Agent, or Firm*—Birch, Stewart, Kolasch & Birch, LLP

(57) ABSTRACT

A fuel cell and a reformer are disposed above and in the vicinity of a horizontal straight line connecting the center of a front axle and the center of a rear axle of a motor vehicle. A fuel tank is disposed in a position above the fuel cell and the reformer. In the case of a fuel cell powered motor vehicle, e.g. a buggy classified as an All Terrain Vehicle (ATV), the drive shaft for transmitting power to the front axle and/or the rear axle can arranged without interfering with components of the fuel cell system.

9 Claims, 6 Drawing Sheets

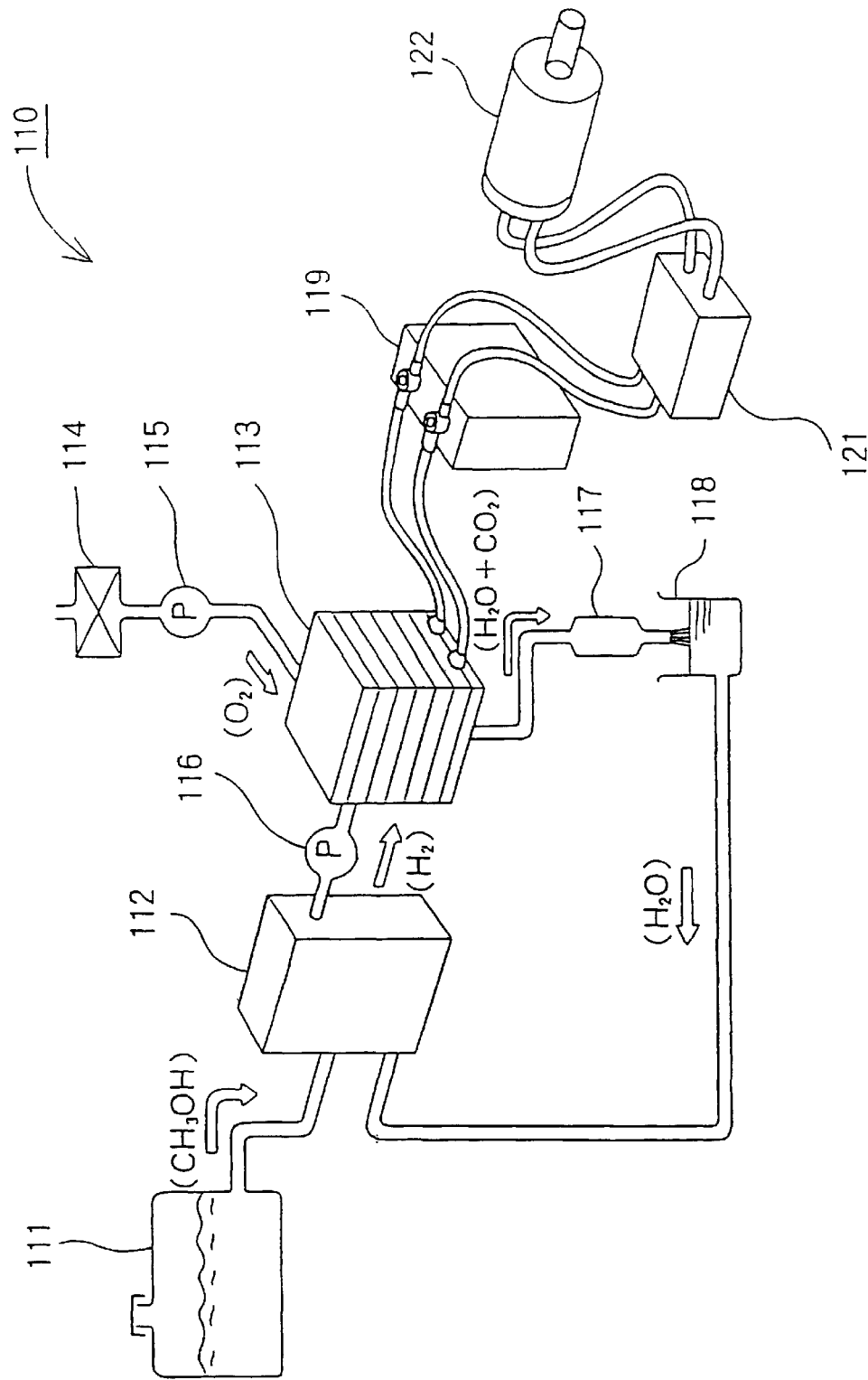

FUEL CELL POWERED MOTOR VEHICLE

CROSS-REFERENCES TO RELATED APPLICATIONS

This nonprovisional application claims priority under 35 U.S.C. §119(a) on Patent Application No. 2000-369642 filed in Japan on Dec. 5, 2000, the entirety of which is herein incorporated by reference.

BACKGROUND OF THE INVENTION

1. Field of the Invention

The present invention relates to a fuel cell powered motor vehicle of the type including a tank containing methanol and water, and more particularly to a fuel cell powered motor vehicle including a reformer, a fuel cell and a secondary storage cell. An embodiment of the present invention is directed toward a fuel cell powered motor vehicle where hydrogen is generated from methanol and water by a reformer. Electricity is generated by an electrochemical reaction between hydrogen and oxygen in the air by the use of a fuel cell. The generated electricity is stored in a secondary cell where it is supplied to the motor as required.

2. Description of the Background Art

An exemplary fuel cell powered motor vehicle is described in Japanese Unexamined Patent Application Publication No. 3-109126, entitled "Electric Automobile Using Fuel Battery." This type of electric motor vehicle includes a fuel cell 13 for an energy source. The fuel cell 13 is disposed at a lower central position of the vehicle body 2 of the vehicle 1.

When using the fuel cell 13 in the aforementioned manner, a fuel tank for storing methanol, a reformer for generating hydrogen, and a secondary cell for storing generated electricity are necessary. The layout of the fuel cell 13, the reformer and the secondary cell is an important factor that must be considered when mounting these elements on the fuel cell powered motor vehicle.

An example of a fuel cell system will now be described based on the principle of power generation of the fuel cell. FIG. 6a and FIG. 6b are schematic views showing principles of power generation of the fuel cell. FIG. 6(a) shows a general principle of the electrolysis of water, and FIG. 6(b) shows the principle of power generation of the fuel cell.

The well-known principles of the electrolysis of water ($H_2O$) are shown in FIG. 6(a). An electrolyte such as sulfuric acid ($H_2SO_4$) is dissolved in water ($H_2O$) and is poured into a water tank 101. Electrodes 102, 103, such as platinum, are placed into the water tank 101 and are covered by containers 104, 105 respectively. A direct current power source 106 is connected between the electrodes 102, 103.

Oxygen gas ($O_2$) is generated at the electrode 102 on the positive side and hydrogen gas ($H_2$) is generated at the electrode 103 on the negative side. In these figures, the arrow (e−) represents a flow of electric charge, and the arrow (H+) represents a flow of hydrogen ions.

In contrast to FIG. 6(a), as shown in FIG. 6(b), oxygen gas ($O_2$) is filled in one of the containers 104 and hydrogen gas ($H_2$) is filled in the other container 105. A load 107 is connected between both electrodes 102, 103 to allow oxygen gas ($O_2$) and hydrogen gas ($H_2$) to react electrochemically in water ($H_2O$) containing electrolyte such as sulfuric acid ($H_2SO_4$). An electric current flows through the load 107 and the oxygen gas ($O_2$) and the hydrogen gas ($H_2$) are combined into water ($H_2O$) as a result of this process.

In other words, the reversal of electrolysis of water shown in FIG. 6(b) is the principle of power generation of the fuel cell. An exemplary fuel cell system will be described hereinafter with reference to FIG. 7. FIG. 7 is a block diagram of an exemplary fuel cell system A fuel cell system 110 includes a fuel tank 111 for storing methanol, a reformer 112 for generating hydrogen from methanol and water, and a fuel cell 113 for allowing hydrogen generated by the reformer 112 and oxygen in the air to react electrochemically. The system 110 also includes a first pump 115 for supplying atmospheric air via an air cleaner 114 to the fuel cell 113, a second pump 116 for feeding hydrogen from the reformer 112 to the fuel cell 113, and a catalyst (catalysis) 117 for receiving water vapor discharged from the fuel cell 113 and carbon dioxide gas generated at the reformer 112 and passed through the fuel cell 113.

The catalyzer 117 reduces the amount of carbon dioxide gas that is released to the atmosphere. A water tank 118 for receiving water discharged from the catalyzer 117 and a secondary cell 119 for storing electricity generated in the fuel cell 113 are also provided in the system 110. A motor 122 is connected to the secondary cell 119 via a controller 121. The secondary cell 119 also stores electricity generated by and for the motor 122.

In FIG. 7, an outlined arrow ($CH_3OH$) represents a flow of methanol, an outlined arrow ($H_2$) represents a flow of hydrogen gas, an outlined arrow ($O_2$) represents a flow of oxygen gas, an outline arrow ($H_2O+CO_2$) represents a flow of water vapor and carbon dioxide gas, respectively, and an outline arrow ($H_2O$) represents a flow of water.

The present inventors have concluded that in order to utilize the fuel cell 113 as an energy source for a fuel cell powered motor vehicle, the fuel tank 111 for storing methanol, the reformer 112 for generating hydrogen, and the secondary cell 119 for storing electricity generated in the fuel cell 113 must be necessarily near one another. When mounting the fuel tank 111, the reformer 112, the fuel cell 113 and so forth on the fuel cell powered motor vehicle, the maintenance, design, weight balance and so on should be considered for optimization. Accordingly, a wide range of layouts for the fuel cell system 110 should be explored.

SUMMARY OF THE INVENTION

The present invention overcomes shortcomings associated with the background art and achieves other advantages not realized by the background art.

An object of the present invention is to provide an optimally arranged fuel cell, reformer, and secondary cell when mounting a fuel cell on a motor vehicle.

These and other objects are accomplished by a fuel cell powered motor vehicle comprising a vehicle body having a vehicle body frame; a front axle supporting a pair of front wheels and a rear axle supporting a pair of rear wheels; a drive shaft for transmitting power to the front axle and the rear axle, the drive shaft arranged in parallel with a horizontal straight line connecting a center of the front axle and a center of the rear axle; and a fuel cell system, the system including a fuel cell, a fuel tank, a reformer, a secondary cell, and a motor, wherein the fuel cell and the reformer are disposed in positions above the horizontal straight line connecting the center of the front axle and the center of the rear axle, and the fuel tank is disposed in a position above the fuel cell and the reformer.

These and other objects are further accomplished by a fuel cell powered motor vehicle comprising a vehicle body having a vehicle body frame; a front axle supporting a pair of front wheels and a rear axle supporting a pair of rear wheels; a drive shaft for transmitting power to the front axle and the rear axle, the drive shaft arranged in parallel with a horizontal straight line connecting a center of the front axle and a center of the rear axle; and a fuel cell system, the fuel cell system arranged in a plurality of positions above the drive shaft.

By arranging the fuel cell and the reformer above and in the vicinity of the horizontal straight line connecting the center of the front axle and the center of the rear axle, in the case where the fuel cell powered motor vehicle is a buggy classified as an All Terrain Vehicle (ATV), a drive shaft for transmitting a power to the front axle and the rear axle can easily be disposed, and a waterproofing measure for the fuel cell and the reformer can be easily incorporated into the vehicle's design. In addition, by arranging a tank above the fuel cell and the reformer, methanol and water can be easily supplied.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 7 is a block diagram of an exemplary fuel cell system.

DETAILED DESCRIPTION OF THE PREFERRED EMBODIMENTS

Figure 1:
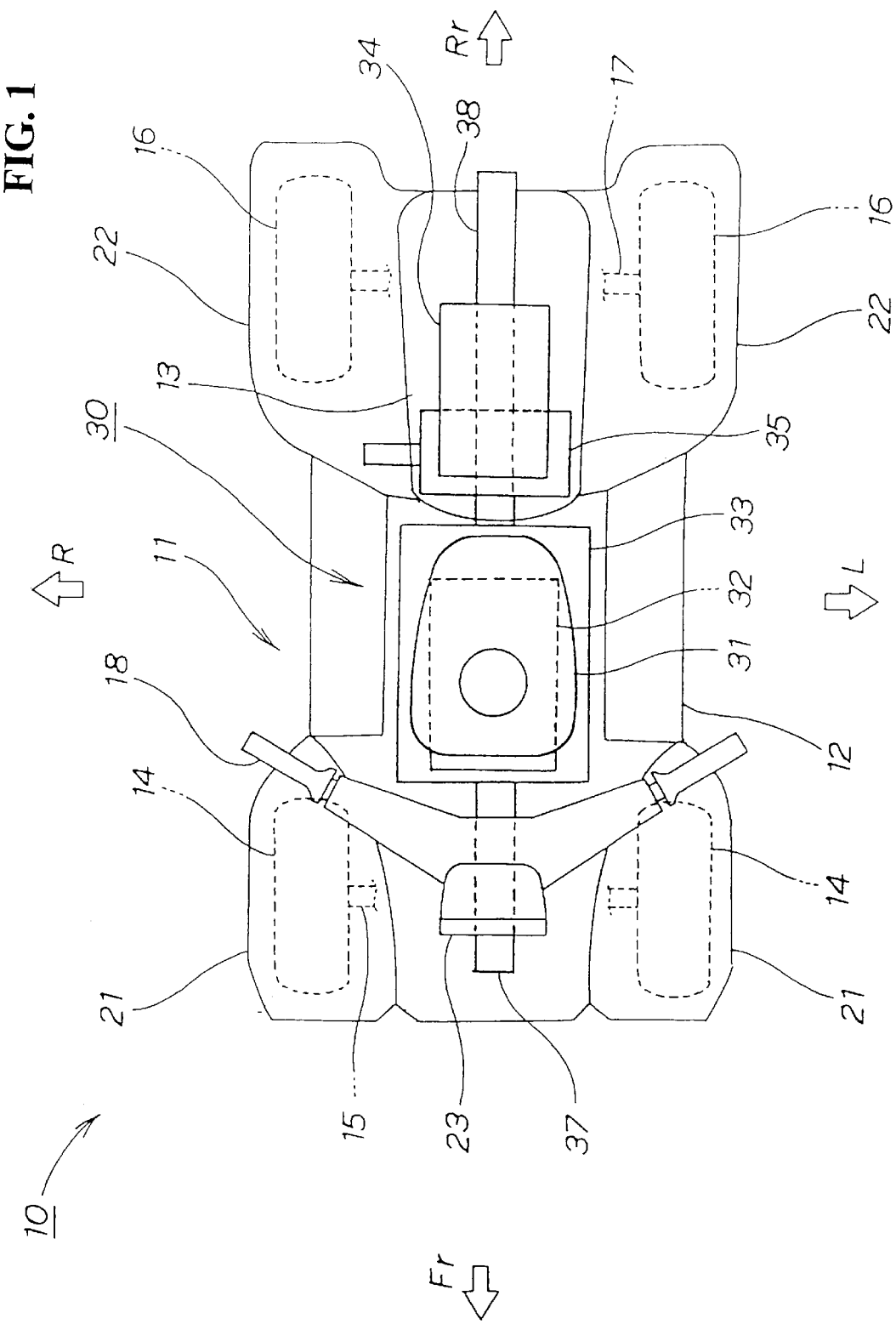
FIG. 1 is a plan view of a fuel cell powered motor vehicle according to an embodiment of the present invention.
Figure 2:
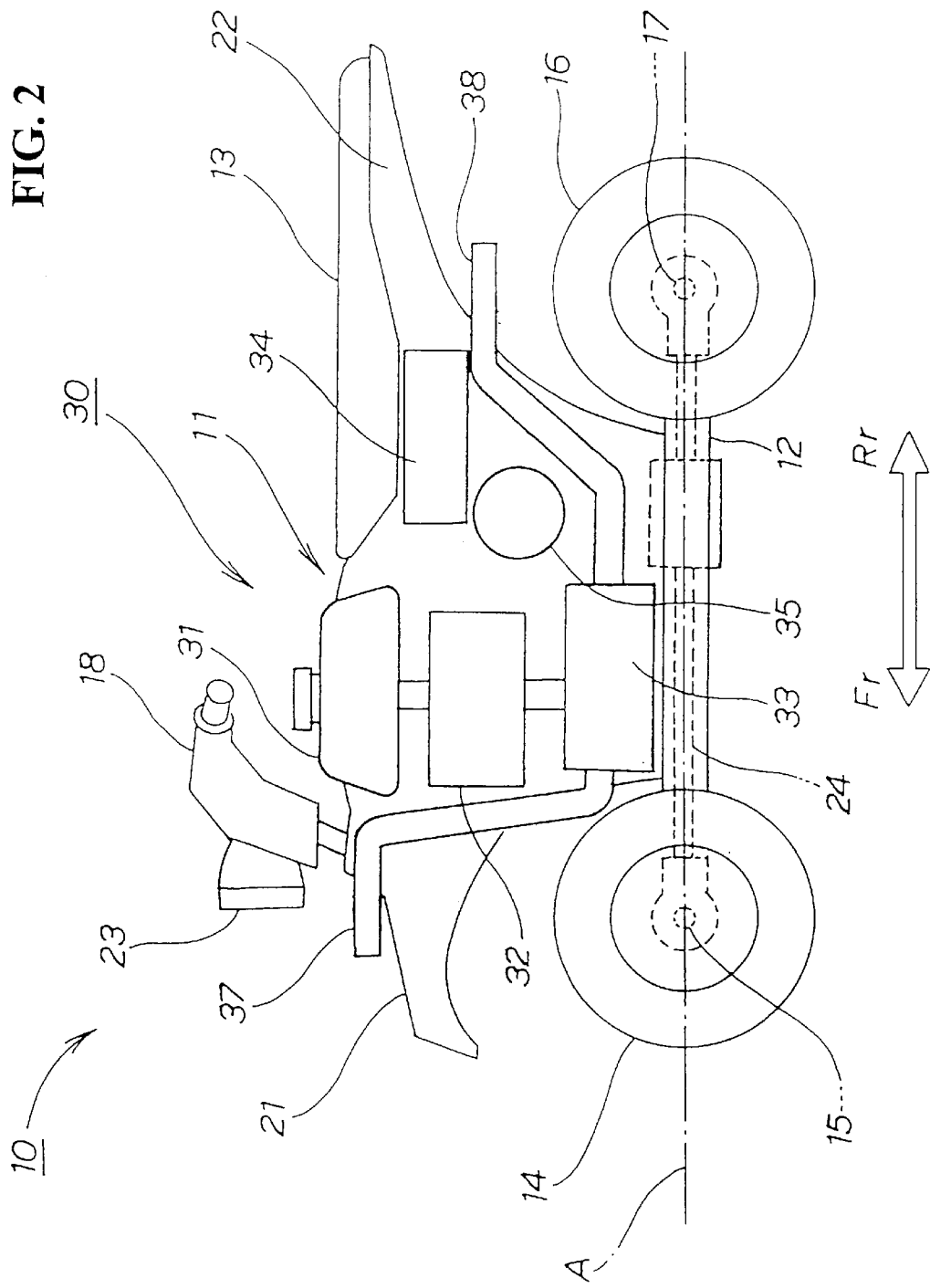
FIG. 2 is a side view of a fuel cell powered motor vehicle according to an embodiment of the present invention.
Figure 3:
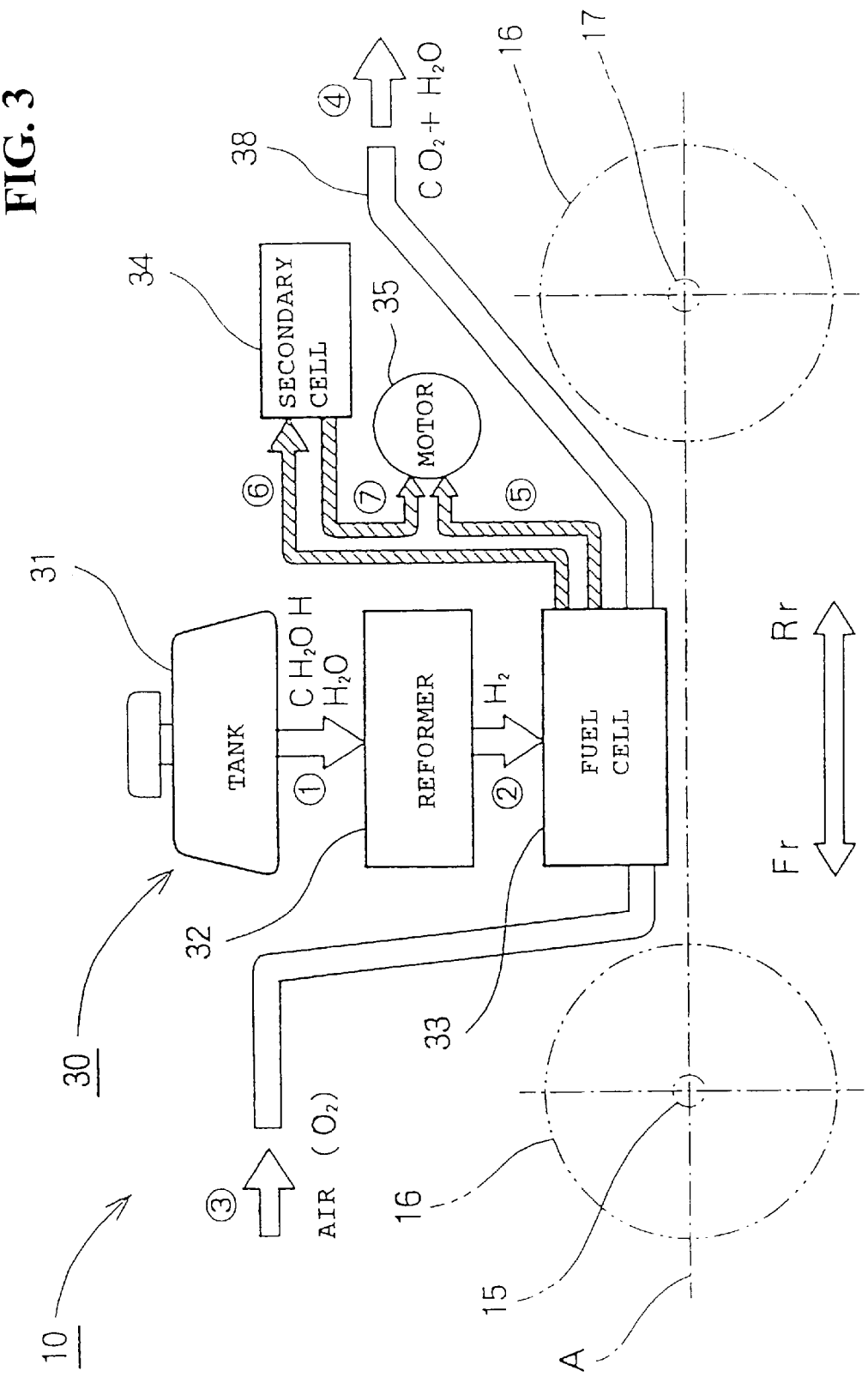
FIG. 3 is a schematic side view showing the operation of a fuel cell powered motor vehicle according to an embodiment of the present invention.
Figure 4:
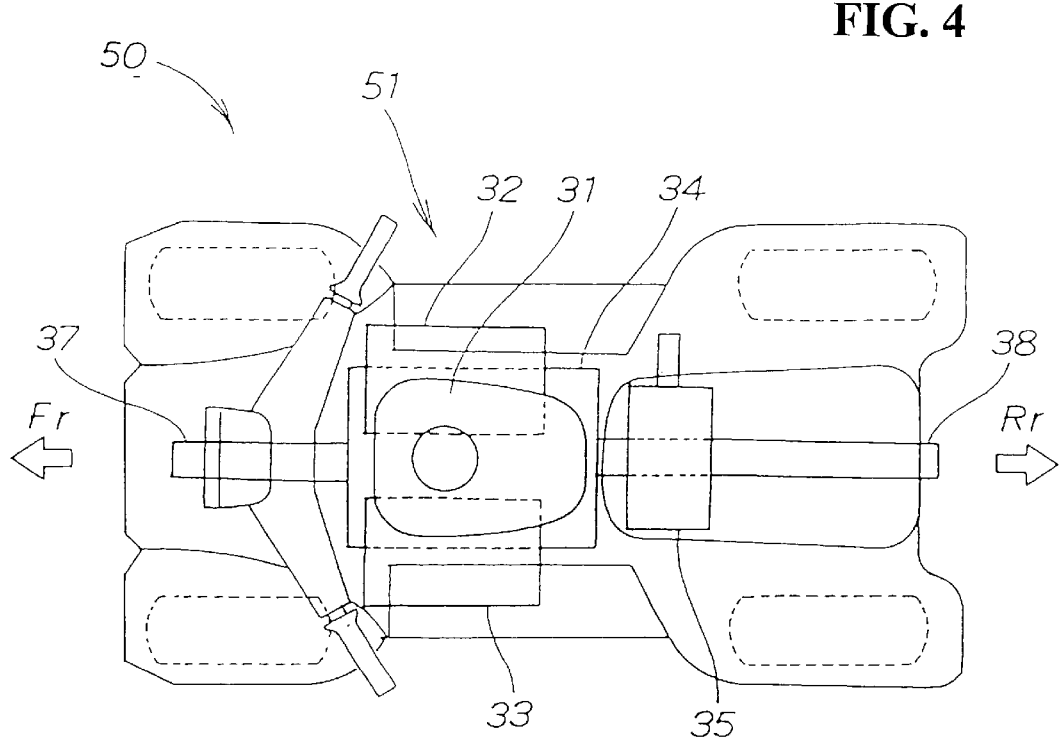
FIG. 4 is a plan view of a fuel cell powered motor vehicle according to a first embodiment of the present invention.
Figure 5:
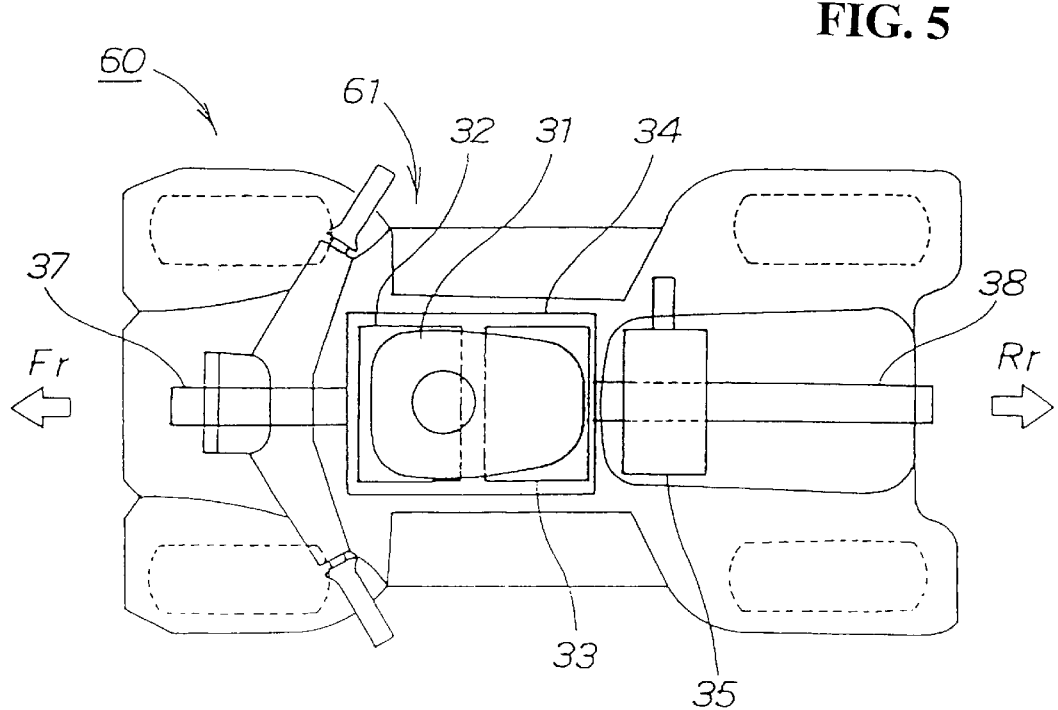
FIG. 5 is a plan view of a fuel cell powered motor vehicle according to a second embodiment of the present invention.
Figure 6A:
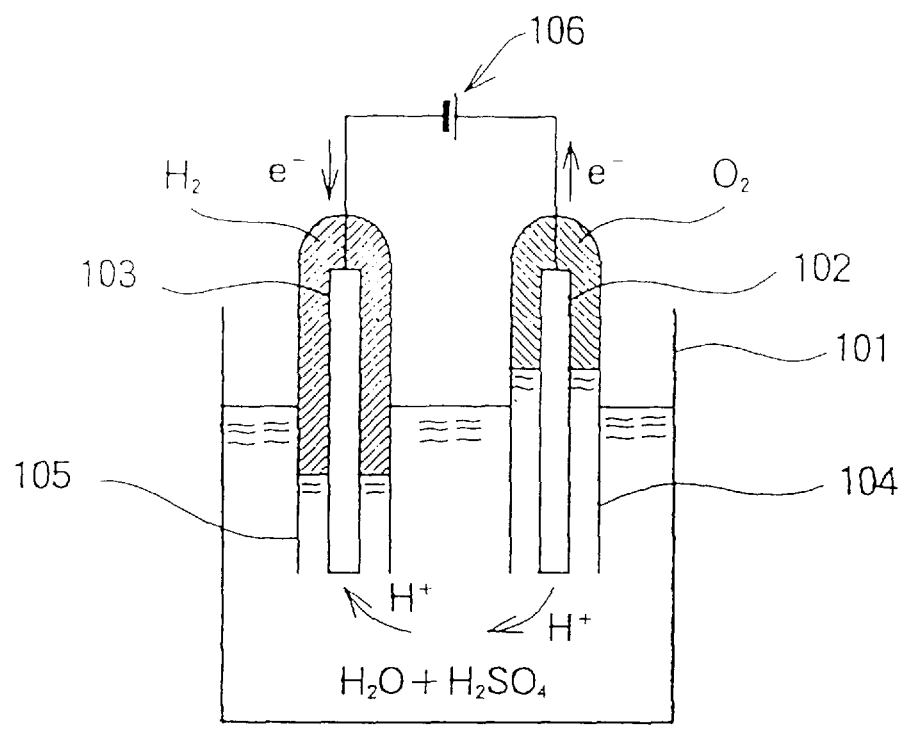
FIG. 6a a schematic view showing principles of power generation of the fuel cell.
Figure 6B:
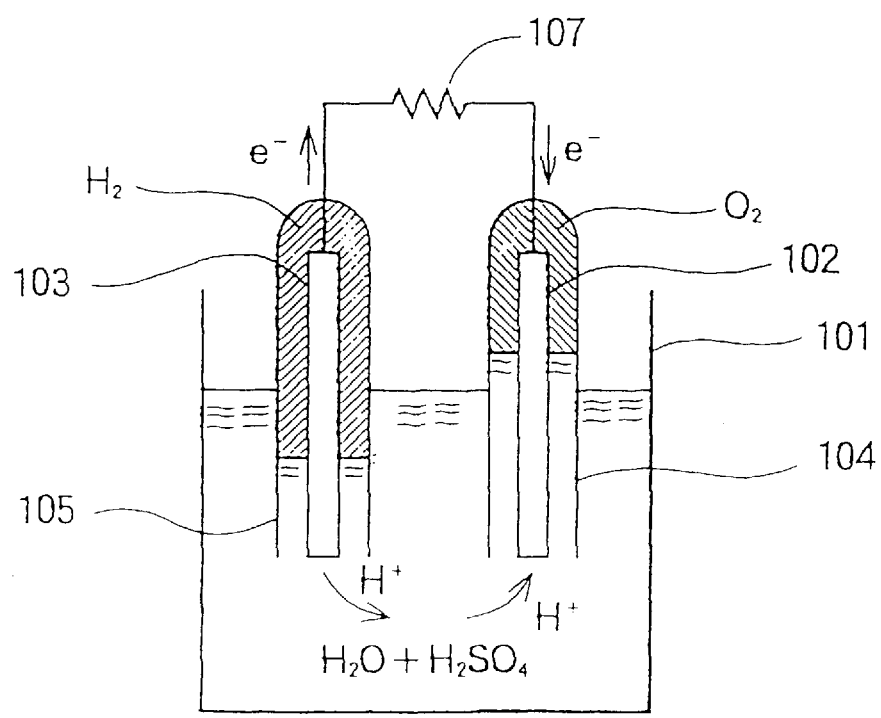
FIG. 6b is a schematic view showing principles of power generation of the fuel cell.

The present invention will be described hereinafter with reference to the accompanying drawings. FIG. 1 is a plan view of a fuel cell powered motor vehicle according to an embodiment of the present invention. FIG. 2 is a side view of a fuel cell powered motor vehicle according to an embodiment of the present invention. FIG. 3 is a schematic side view showing the operation of a fuel cell powered motor vehicle according to an embodiment of the present invention. FIG. 4 is a plan view of a fuel cell powered motor vehicle according to a first embodiment of the present invention. FIG. 5 is a plan view of a fuel cell powered motor vehicle according to a second embodiment of the present invention. FIG. 6a a schematic view showing principles of power generation of the fuel cell. FIG. 6b is a schematic view showing principles of power generation of the fuel cell. FIG. 7 is a block diagram of an exemplary fuel cell system The present invention will be further illustrated referring to the attached drawings. The terms "front", "rear", "left", "right", "upward", and "downward" are indicative of directions as viewed from the perspective of an operator of the vehicle. Fr designates the front, Rr designates the rear, L designates the left, and R designates the right.

FIG. 1 is a plan view of a fuel cell powered motor vehicle according to an embodiment of the present invention. The fuel cell powered motor vehicle 10 is a buggy having a fuel cell 33 mounted thereon, e.g. a vehicle classified as an ATV (All Terrain Vehicle). Since it is a vehicle having a light-weight and compact vehicle body, along with a small turning radius and being easily operable, it is an off-road vehicle suitable for transportation for agriculture, cattle breeding, hunting, security surveillance, and for leisure.

The fuel cell powered motor vehicle 10 includes a vehicle body 11, a vehicle body frame 12 and a seat 13. A front axle 15 supports a pair of front wheels 14 and a rear axle 17 supports a pair of rear wheels 16. The vehicle 10 also includes a bar handle 18, front fenders 21, rear fenders 22, and a headlight 23. A fuel cell system 30 includes a tank, a reformer 32, the fuel cell 33, a secondary cell 34, an electric motor 35, an intake pipe 37, and a tail pipe 38.

FIG. 2 is a side view of a fuel cell powered motor vehicle according to an embodiment of the present invention. The fuel cell system 30 includes the tank 31 for storing methanol and water, the reformer 32 for generating hydrogen from methanol and water supplied from the tank 31, and the fuel cell 33 for generating electricity by an electrochemical reaction between the hydrogen generated by the reformer 32 and oxygen in the air.

The secondary cell 34 is provided for storing electricity generated in the fuel cell 33 and supplying the motor 35 with electricity from the fuel cell 33. The secondary cell 34, the intake pipe 37 for taking air into the fuel cell 33, and the tail pipe 38 for discharging water, carbon dioxide, and the like from the fuel cell 33 are also shown in FIG. 2.

A drive shaft 24 for transmitting power to the front axle 15 and the rear axle 17 is provided for the vehicle 10. The tank 31, reformer 32, fuel cell 33, secondary cell 34, and the motor 35 are all disposed in various positions above the drive shaft 24.

Upon receiving power for rotation from the secondary cell 34 and fuel cell 33, the rotation of the motor 35 is transmitted to the front axle 15, the rear axle 17, and/or the front and rear axles 15 and 17. The fuel cell 33 and the reformer 32 are disposed above and in the vicinity of a horizontal straight line (A) connecting the center of the front axle 15 and the center of the rear axle 17 in side view. The tank 31 is disposed above the fuel cell 33 and the reformer 32.

The fuel cell powered motor vehicle 10 travels by supplying methanol and water from the tank 31 to the reformer 32, generating hydrogen from methanol and water by the reformer 32, supplying generated hydrogen to the fuel cell 33, generating electricity in the fuel cell 33, and supplying generated electricity for the rotation of motor 35.

Since the fuel cell 33 and the reformer 32 are disposed above and in the vicinity of the straight line A connecting the center of the front axle 15 and the center of the rear axle 17 (as seen in the side view of FIG. 2), the drive shaft 14 for transmitting power to the front axle 15 and the rear axle 17 can easily disposed without interference with various components of the fuel cell system 30. Further, waterproofing measures for the fuel cell 33, the reformer 32 and other related components can be more easily incorporated into the vehicle's design.

The tank 31 is disposed above the fuel cell 33 and the reformer 32 so that methanol and water can easily be supplied and with desirable head. Since the secondary cell 34 and the motor 35 are disposed above the straight line A connecting the center of the front axle 15 and the center of the rear axle 17, a waterproofing measure for the secondary cell 34 and the motor 35 can be more easily taken since these components are removed from direct contact with water and debris from the surrounding environment.

FIG. 3 is a schematic side view showing the operation of a fuel cell powered motor vehicle according to an embodiment of the present invention. The fuel cell system 30 feeds methanol ($CH_3OH$) and water ($H_2O$) from the tank 31 to the reformer 32 as shown by the arrow (1) to generate hydrogen ($H_2$) from the reformer 32. Hydrogen ($H_2$) generated by the reformer 32 is fed to the fuel cell 33 as shown by the arrow (2). Feed oxygen ($O_2$) is supplied from the atmosphere to the fuel cell 33 as shown by the arrow (3) to aid in the generation of electricity in the fuel cell 33.

Water vapor ($H_2O$) generated from the fuel cell 33 and carbon dioxide ($CO_2$) generated by the reformer 32 both pass through the fuel cell 33 and are discharged. Exhaust gas such as carbon dioxide ($CO_2$) is reduced by a catalyst (not shown) and discharged from the tail pipe 38 into the atmosphere as shown by the arrow (4). Gas generated from the fuel cell 33 or the reformer 32 may contain a small amount of gas such as carbon monoxide or carbon hydride that is reduced by a catalyst.

Electricity generated in the fuel cell 33 is supplied to the motor 35 as shown by the arrow (5), and stored in the secondary cell 34 as shown by the arrow (6). Electricity is also supplied from the secondary cell 34 to the motor 35 as shown by the arrow (7).

FIG. 4 is a plan view of a fuel cell powered motor vehicle according to a first embodiment of the present invention. A fuel cell powered motor vehicle 50 is shown having the same components as in the fuel cell system 30 (See FIG. 1). Accordingly, elements common to FIG. 1 and FIG. 4 and having the same reference numerals will not be described in detail hereinafter.

As seen in FIG. 4, the fuel cell powered motor vehicle 50 includes a fuel cell 33 disposed on a left side of the vehicle body 51, and the reformer 32 on a right side of the vehicle body 51. By disposing the fuel cell 33 and the reformer 32 separately on the left and right sides of the vehicle body 51, the vehicle body 51 can be weight balanced, e.g. an even weight distribution can be maintained.

FIG. 5 is a plan view of a fuel cell powered motor vehicle according to a second embodiment of the present invention. A fuel cell powered motor vehicle 60 is shown having the same components as in the fuel cell system 30 shown in FIG. 1. The fuel cell powered motor vehicle 60 includes the reformer 32 at the front of the vehicle body 61 and the fuel cell 33 at the rear of the vehicle body 61. By disposing the fuel cell 33 and the reformer 32 separately at the front and rear of the vehicle body 11, the weight balance of the vehicle body 11 can be maintained to control the desired positioning of the center of gravity of the vehicle.

As shown in the embodiment in FIG. 1, the fuel cell powered motor vehicle 10 is described to be a buggy. However, it is not limited to the buggy, and it may be any four wheeled motor vehicle that includes a fuel cell mounted thereon.

In the embodiment shown in FIG. 4, the fuel cell 33 is disposed on the left of the vehicle body 51, and the reformer 32 is disposed on the right of the vehicle body 51. However, it is not limited thereto, and a changing of places between the reformer 32 and the fuel cell 33 is possible.

In addition, in the embodiment shown in FIG. 5, the reformer 32 is disposed at the front of the vehicle body 61, and the fuel cell 33 is disposed at the rear of the vehicle body 61. However, it is not limited thereto, and the positioning of the reformer 32 and the fuel cell 33 is possible.

The following advantages are realized by the embodiments of present invention constructed as described hereinabove. Since a fuel cell and a reformer are disposed above and in the vicinity of the straight line connecting the center of the front axle and the center of the rear axle in side view, and a tank is disposed above the fuel cell and the reformer, the drive shaft may be easily disposed and an inexpensive waterproofing measure may be incorporated into the vehicle design. Since the tank is disposed in a position above the fuel cell and the reformer, fuel such as methanol and water may easily be supplied to the fuel cell and reformer under pressure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel cell powered motor vehicle comprising:
a vehicle body having a vehicle body frame;
a front axle supporting a pair of front wheels and a rear axle supporting a pair of rear wheels;
a drive shaft for transmitting power to the front axle and the rear axle, said drive shaft arranged in parallel with a horizontal straight line connecting a center of the front axle and a center of the rear axle; and
a fuel cell system, said system including a fuel cell, a fuel tank, a reformer, a secondary cell, and a motor, wherein the fuel cell and the reformer are disposed in positions above said horizontal straight line connecting the center of the front axle and the center of the rear axle, and the fuel tank is disposed in a position above the fuel cell and the reformer.

2. The fuel cell powered motor vehicle according to claim 1, wherein the secondary cell and the motor are disposed in positions above the straight line.

3. The fuel cell powered motor vehicle according to claim 1, wherein the fuel cell is disposed on a right side of the vehicle body and the reformer is disposed on a left side of the vehicle body.

4. The fuel cell powered motor vehicle according to claim 1, wherein the fuel cell is disposed on a left side of the vehicle body and the reformer is disposed on a right side of the vehicle body.

5. The fuel cell powered motor vehicle according to claim 1, wherein the fuel cell is disposed on a front side of the vehicle body and the reformer is disposed on a rear side of the vehicle body.

6. The fuel cell powered motor vehicle according to claim 1, wherein the fuel cell is disposed on a rear side of the vehicle body and the reformer is disposed on a rear side of the vehicle body.

7. A fuel cell powered motor vehicle comprising:
a vehicle body having a vehicle body frame;
a front axle supporting a pair of front wheels and a rear axle supporting a pair of rear wheels;
a drive shaft for transmitting power to the front axle and the rear axle, said drive shaft arranged in parallel with a horizontal straight line connecting a center of the front axle and a center of the rear axle; and a fuel cell system, said fuel cell system being arranged between said front axle and said rear axle, wherein said fuel cell system includes a reformer; a fuel cell; a fuel tank; and a motor, wherein said reformer and said fuel cell are located above said horizontal straight line connecting the center of the front axle and the center of the rear axle and said fuel tank is located above said reformer and said fuel cell.

8. The fuel cell powered motor vehicle according to claim 7 wherein said motor is located above said horizontal straight line connecting the center of the front axle and the center of the rear axle.

9. A fuel cell powered motor vehicle comprising:

a vehicle body having a vehicle body frame;

a front axle supporting a pair of front wheels and a rear axle supporting a pair of rear wheels;

a drive shaft for transmitting power to at least one of the front axle and the rear axle, said drive shaft being arranged in parallel with a horizontal straight line connecting a center of the front axle and a center of the rear axle; and a fuel cell system, said system including a fuel cell, a fuel tank, a reformer, a secondary cell, and a motor, wherein the fuel cell and the reformer are disposed in positions above said horizontal straight line connecting the center of the front axle and the center of the rear axle, and the fuel tank is disposed in a position above the fuel cell and the reformer.

* * * * *